(12) United States Patent
Lomayev et al.

(10) Patent No.: US 12,177,143 B2
(45) Date of Patent: Dec. 24, 2024

(54) APPARATUS, SYSTEM AND METHOD OF WIRELESS SENSING

(71) Applicant: INTEL CORPORATION, Santa Clara, CA (US)

(72) Inventors: Artyom Lomayev, Nizhny Novgorod (RU); Claudio Da Silva, Portland, OR (US); Alexander Maltsev, Nizhny Novgorod (RU); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 909 days.

(21) Appl. No.: 17/083,502

(22) Filed: Oct. 29, 2020

(65) Prior Publication Data

US 2021/0044407 A1 Feb. 11, 2021

(51) Int. Cl.
*H04L 5/00* (2006.01)
*H04L 25/02* (2006.01)

(52) U.S. Cl.
CPC .......... *H04L 5/0048* (2013.01); *H04L 5/0023* (2013.01); *H04L 25/0202* (2013.01)

(58) Field of Classification Search
None
See application file for complete search history.

(56) References Cited

U.S. PATENT DOCUMENTS

| 10,305,766 B1* | 5/2019 | Zhang | G06N 3/044 |
| 2018/0146076 A1* | 5/2018 | Verma | H04B 7/0413 |

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

*Primary Examiner* — Hong Shao
(74) *Attorney, Agent, or Firm* — Shichrur & Co.

(57) ABSTRACT

For example, a first device may calibrate a reference channel estimation based on a plurality of first channel estimation measurements, the plurality of first channel estimation measurements corresponding to first PPDUs received from a second device over a wireless channel, wherein two consecutive channel estimation measurements of the plurality of first channel estimation measurements are separated by no more than a first time interval; and determine a plurality of second channel estimation measurements for detection of a change in an environment of the wireless channel based on the reference channel estimation, wherein the plurality of second channel estimation measurements corresponds to a plurality of second PPDUs received from the second device over the wireless channel, wherein two consecutive channel estimation measurements of the plurality of second channel estimation measurements are separated by at least a second time interval, the second time interval is longer than the first time interval.

24 Claims, 9 Drawing Sheets

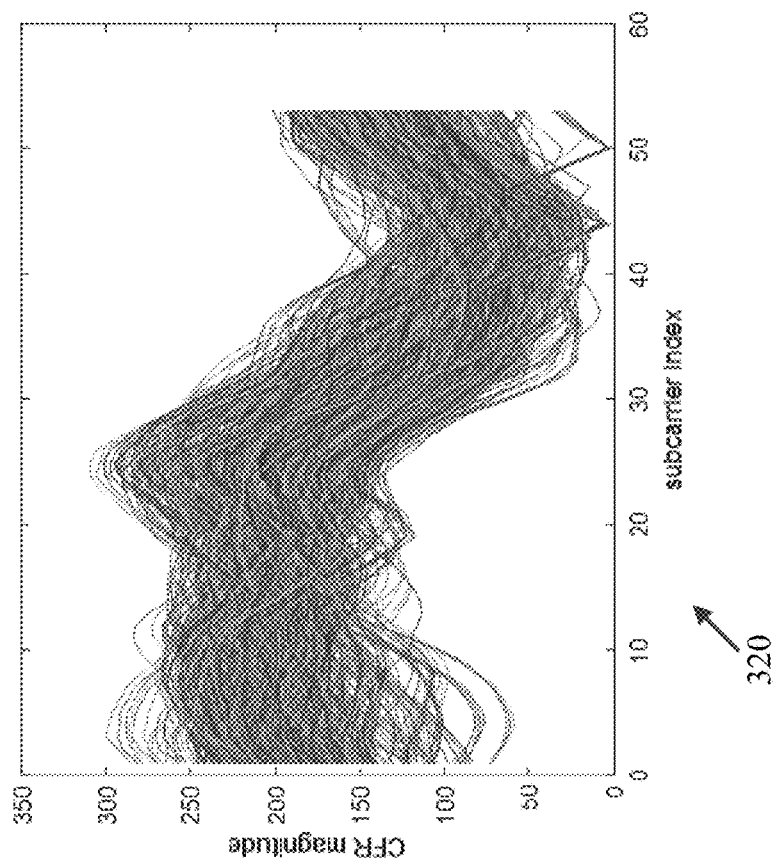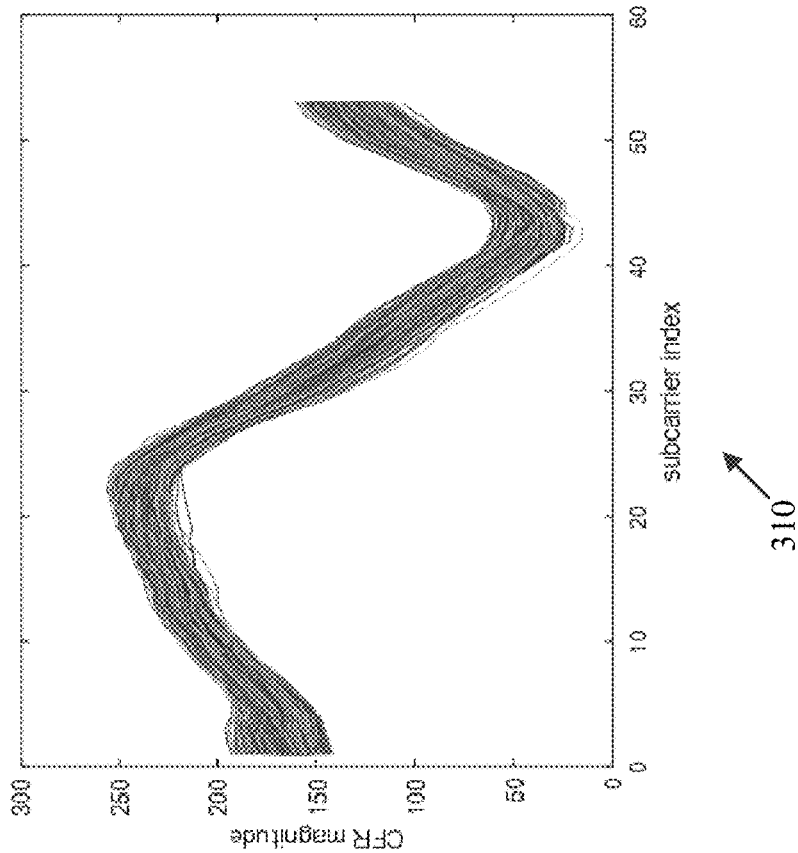
Fig. 3

802

Calibrate at a first wireless communication device a reference channel estimation based on a plurality of first channel estimation measurements, the plurality of first channel estimation measurements corresponding to one or more first PHY Protocol Data Units (PPDUs) received from a second wireless communication device over a wireless communication channel, wherein two consecutive channel estimation measurements of the plurality of first channel estimation measurements are separated by no more than a first time interval

804

Determine at the first wireless communication device a plurality of second channel estimation measurements to be processed for detection of a change in an environment of the wireless communication channel based on the reference channel estimation, wherein the plurality of second channel estimation measurements corresponds to a plurality of second PPDUs received from the second wireless communication device over the wireless communication channel, wherein two consecutive channel estimation measurements of the plurality of second channel estimation measurements are separated by at least a second time interval, the second time interval is longer than the first time interval.

Fig. 8

APPARATUS, SYSTEM AND METHOD OF WIRELESS SENSING

TECHNICAL FIELD

Embodiments described herein generally relate to wireless sensing.

BACKGROUND

Wireless sensing is a term given to a usage of wireless technology to perform radar-like applications. For example, wireless sensing may be used to detect motion in a room, for example, to detect when a person approaches a target device.

The wireless sensing may be implemented by a wireless communication device, which is capable to receive wireless signals, for example, to detect changes in an environment where the wireless signals propagate.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of graphs depicting channel estimates, in accordance with some demonstrative embodiments.

FIG. 8 is a schematic flow-chart illustration of a method of wireless sensing, in accordance with some demonstrative embodiments.

DETAILED DESCRIPTION

Figure 1:
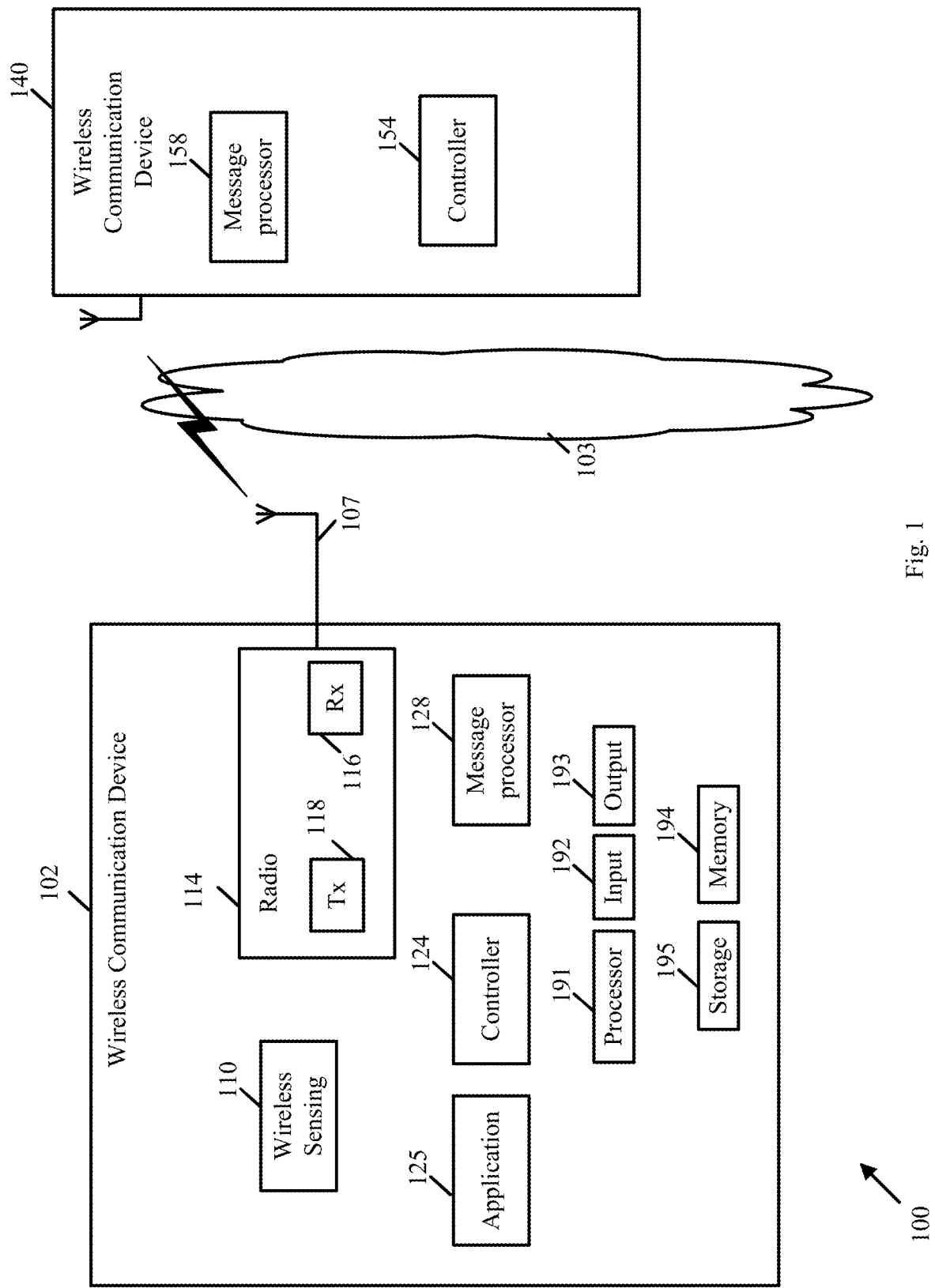
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a wireless station (STA), a User Equipment (UE), a Bluetooth device, a Bluetooth Low Energy (BLE) device, a Mobile Device (MD), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016), and/or IEEE 802.11bf (IEEE 802.11*bf Amendment: Wireless Local Area Sensing (SENS)*)) and/or future versions and/or derivatives thereof, devices and/or networks operating in accordance with existing WFA Peer-to-Peer (P2P) specifications (*WiFi P2P technical specification, version* 1.7, Jul. 6, 2016) and/or future versions and/or derivatives thereof, devices and/or networks operating in accordance with existing cellular specifications and/or protocols, e.g., 3GPP Long Term Evolution (LTE), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. Other embodiments may be implemented utilizing any other suitable wireless communication frequency bands, for example, an Extremely High Frequency (EHF) band (the millimeter wave (mmWave) frequency band), for example, a frequency band within the frequency band of between 20 GHz and 300 GHz, e.g., a frequency band above 45 Ghz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., a wireless communication device 102, and/or at least one wireless communication device 140.

In some demonstrative embodiments, wireless communication device 102 may include, for example, a UE, an MD, a STA, an AP, a PC, a Smartphone, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of, any other devices and/or STAs.

In some demonstrative embodiments, device 102 may include a STA and/or device 140 may include an access point (AP) STA.

In one example, device 102 may be configured to operate as, perform one or more operations of, and/or to perform the functionality of, an AP; and/or device 140 may be configured to operate as, and/or to perform the functionality of, a non-AP STA.

In one example, device 140 may be configured to operate as, perform one or more operations of, and/or to perform the functionality of, an AP; and/or device 102 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 and/or device 140 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a channel, a WiFi channel, a cellular channel, a Global Navigation Satellite System (GNSS) Channel, an RF channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a frequency band above 45 GHz, a Sub-1 GHz (S1G) band, and/or any other frequency band.

In some demonstrative embodiments, devices 102 and/or 140 may include one or more radios including circuitry and/or logic to perform wireless communication between devices 102, 140 and/or one or more other devices. For example, device 102 and/or device 140 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may be configured to communicate over a 2.4 GHz, a 5 GHz band, a band above 45 Ghz, an S1Gb and, and/or any other band.

In some demonstrative embodiments, radio 114 may include, or may be associated with, one or more antennas.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, device 140 may include a controller 154 configured to perform and/or to trigger, cause, instruct and/or control device 140 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controller 124 and/or controller 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 128 and/or message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 and/or message processor 158 may be configured to perform any other additional or alternative functionality and/or may include any other additional or alternative components to generate and/or process a message to be transmitted.

In some demonstrative embodiments, message processor 128 and/or message processor 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128 and/or message processor 158. Additionally or alternatively, one or more functionalities of message processor 128 and/or message processor 158 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include, operate as, perform the role of, and/or perform one or more functionalities of, one or more STAs.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In other embodiments, device 102 and/or device 140 may form, and/or communicate as part of, any other additional or alternative network.

In some demonstrative embodiments, device 102 may be configured to perform wireless sensing, e.g., as describe below.

In some demonstrative embodiments, wireless sensing (also referred to as "WLAN sensing" or "Wi-Fi sensing") may refer to a term given to a usage of wireless technology to detect changes in an environment of a device, e.g., an environment of device 102, for example, based on received wireless signals, e.g., signals received by device 102, for example, from one or more other devices, e.g., including device 140.

In some demonstrative embodiments, the environment of the device may include an area around the device, e.g., within a few centimeters or meters from the device. The area may include a room, a house, an enterprise, and the like.

In some demonstrative embodiments, WLAN sensing technology may utilize Physical Layer (PHY) and/or Medium Access Control (MAC) features of a WLAN STA, e.g., a IEEE 802.11 station and/or any other type of wireless station, to obtain channel measurements that characterize the environment in which the station operates.

In some demonstrative embodiments, measurements obtained with WLAN sensing may be used to enable and/or support applications such as, for example, presence detection, proximity detection, device-free positioning, gesture classification, among many others.

In one example, the wireless sensing may include performing radar-like applications. For example, wireless sensing may be used to detect motion in a room, for example, to detect when a person approaches a target device.

In some demonstrative embodiments, the wireless sensing may be configured to detect one or more features in the environment, for example, a motion, a presence or proximity, a gesture, a people count, a geometry, a velocity, and/or the like.

In some demonstrative embodiments, the wireless sensing may be configured to detect a target in the environment, for example, an object, a human, an animal, and/or the like.

In some demonstrative embodiments, the wireless sensing may be used by a wireless sensing device, e.g., device 102, which is capable to receive wireless signals, for example, in order to detect changes in an environment, e.g., where the wireless signals propagate.

In some demonstrative embodiments, a wireless sensing device, e.g., device 102, may be configured to perform the wireless sensing, for example, by tracking a channel state of a wireless communication channel, which may be obtained, for example, when decoding a plurality of received wireless packets over time, for example, in order to detect changes, which may indicate an even of interest, e.g., as described below.

In some demonstrative embodiments, the channel state may include one or more parameters of the wireless communication channel, which may be estimated by a receiver based on one or more fields, for example, a Long Training Field (LTF), a Training (TRN) field and/or any other field, e.g., as described below.

In one example, the channel state of the wireless communication channel may be determined based on a Channel Frequency Response (CFR) of the wireless communication channel.

In another example, the channel state of the wireless communication channel may be determined based on a Channel State Information (CSI) of the wireless communication channel.

In another example, the channel state of the wireless communication channel may be determined based on a Signal to Noise Ratio (SNR) of the wireless communication channel.

In another example, the channel state of the wireless communication channel may be determined based on a Received Signal Strength Indicator (RSSI) of the wireless communication channel.

In other embodiments, the channel state of the wireless communication channel may be determined based on any other additional or alternative measurements, estimations and/or parameters.

In some demonstrative embodiments, the channel state of the wireless communication channel may be estimated by a receiver, e.g., device 102, when processing a PPDU to extract transmitted data from the PPDU, for example, using a field, for example, an LTF, a TRN field, and/or any other field, of the PPDU.

In one example, the channel state of the wireless communication channel may be estimated based on a High Throughput (HT) LTF of a HT PPDU.

In another example, the channel state of the wireless communication channel may be estimated based on a Very-High Throughput (VHT) LTF of a VHT PPDU.

In another example, the channel state of the wireless communication channel may be estimated based on an Extremely-High Throughput (EHT) LTF of an EHT PPDU.

In another example, the channel state of the wireless communication channel may be estimated based on an Enhanced Directional Multi-Gigabit (EDMG) LTF of an EDMG PPDU.

In another example, the channel state of the wireless communication channel may be estimated based on a non-HT, non-VHT, non-EHT, and/or non-EDMG LTF (also referred to as a "legacy" LTF), e.g., an L-LTF.

In other embodiments, the channel state of the wireless communication channel may be estimated based on any other additional or alternative field of any other additional or alternative PPDU.

In some demonstrative embodiments, the wireless sensing device, e.g., device 102, may detect variations in the received wireless packets, which may indicate a change in the environment, for example, a motion in the environment, e.g., as described below.

In some demonstrative embodiments, the wireless sensing may not require that a person and/or an object that is being tracked or detected should carry or have a wireless device or transmitter, or that a carried wireless device collaborate with the wireless sensing device.

For example, the wireless sensing may be performed passively, for example, by relying on changes of the channel state, which may be caused by the changes in the environment, e.g., changes cause by a person or an object moving in the environment.

In some demonstrative embodiments, device 102 may include a wireless sensing component (also referred to as "WLAN sensor", "wireless sensing processor" or "wireless sensor") 110 configured to sense changes in an environment, for example, based on wireless communication technology, e.g., as described below.

In some demonstrative embodiments, wireless sensing component 110 may be configured to perform one or wireless sensing measurements, operations and/or communications, e.g., as described below.

In some demonstrative embodiments, wireless sensing processor 110 may be configured to detect the one or more changes in the environment, for example, to detect a motion in the environment, e.g., as described below.

Some demonstrative embodiments are described herein with respect to a wireless sensing component, e.g., wireless sensing component 110, configured to perform measurements for motion detection. However, in other embodiments, the wireless sensor may be configured to perform any other additional or alternative type of wireless sensing, e.g., to detect any other changes in the environment and/or for any other suitable wireless sensing applications.

In some demonstrative embodiments, wireless sensing component 110 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of wireless sensing component 110. Additionally or alternatively, one or more functionalities of wireless sensing component 110 may be implemented by logic, which may be executed by a machine and/or one or more processors, e.g., as described below.

In one example, wireless sensing component 110 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities for wireless sensing, e.g., as described herein. In one example, wireless sensing component 110 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, wireless sensing component 110 may be configured to perform one or more operations of, and/or at least part of the functionality of, message processor 128 and/or controller 124, for example, to trigger and/or process communications and/or transmissions of one or more wireless sensing messages and/or wireless sensing signals.

In some demonstrative embodiments, wireless sensing component 110 may be configured to trigger wireless sensing measurements, for example, periodically and/or upon a request, from an application executed by device 102, for example, to determine the changes in the environment.

In some demonstrative embodiments, device 102 may include one or more applications configured to provide and/or to use one or more wireless sensing applications and/or services. For example, device 102 may include an application 125 to be executed by device 102.

In some demonstrative embodiments, application 125 may use wireless sensing information, for example, from wireless sensing component 110, for example, to provide one or more wireless sensing applications and/or services.

In one example, application 125 may include a motion detection application configured to provide and/or manage alerts and/or information with respect to motion in an environment. According to this example, application 125 may use the wireless sensing information, e.g., from wireless sensing component 110, for example, to detect human presence or motions in an environment, approaching a target or leaving a target, and/or the like. For example, wireless sensing component 110 may output a motion alert, e.g., to be received by application 125, for example, to indicate motion in the environment, based on the detection of changes in the environment.

In another example, application 125 may include an office management application configured to manage offices, conference rooms, and the like. According to this example, application 125 may use the wireless sensing information, e.g., from wireless sensing component 110, for example, to determine presence of employees, availability of conference rooms, presence in conference rooms, and/or the like.

In another example, application 125 may include a safety or security application configured to provide safety and/or security alerts to a user. According to this example, application 125 may use the wireless sensing information, e.g., from wireless sensing component 110, for example, to determine presence of kids in a locked vehicle, presence of intruders in an environment, and/or the like.

In another example, application 125 may include a health application configured to provide health information to a user. According to this example, application 125 may use the wireless sensing information, e.g., from wireless sensing component 110, for example, to determine biometric abnormalities, to assist in elderly care, and/or the like.

In another example, application 125 may include a user interface (UX) application or service configured to provide gesture information to an operating system of device 102, and/or any other applications. According to this example, application 125 may use the wireless sensing information, e.g., from wireless sensing component 110, for example, to detect gestures of a user, e.g., coarse or fine, for example, finger movements or hand waves, and/or the like.

In another example, application 125 may include any other application or service configured to use the wireless sensing information, e.g., from wireless sensing component 110.

In one example, application 125 may be configured as a WLAN sensing-based home security application.

For example, device 102 may be implemented as an AP STA, which may be associated with multiple non-AP STAs located in the same room or house. For example, the AP STA may measure channel estimates, for example, the CSI, of a given wireless link, e.g., to a given non-AP STA, for example, with respect to some or all received PPDUs, e.g., for each PPDU the AP STA receives.

For example, WLAN sensor 110 may track the time-evolution of the channel, for example, by determining how much the channel changes, e.g., how much the CSI of the channel changes, from one PPDU to the next.

For example, it is expected that none of the wireless links being tracked will change "much" over time, e.g., except for changes due to sensing noise, as discussed below, for example, in case there is no motion in the house.

For example, it is expected that at least one of the wireless links will show significant change. For example, the CSIs obtained with consecutive PPDUs will vary more than typically seen when the only source of noise/change is sensing noise, for example, in case someone, e.g., a burglar, enters the house.

Figure 2:
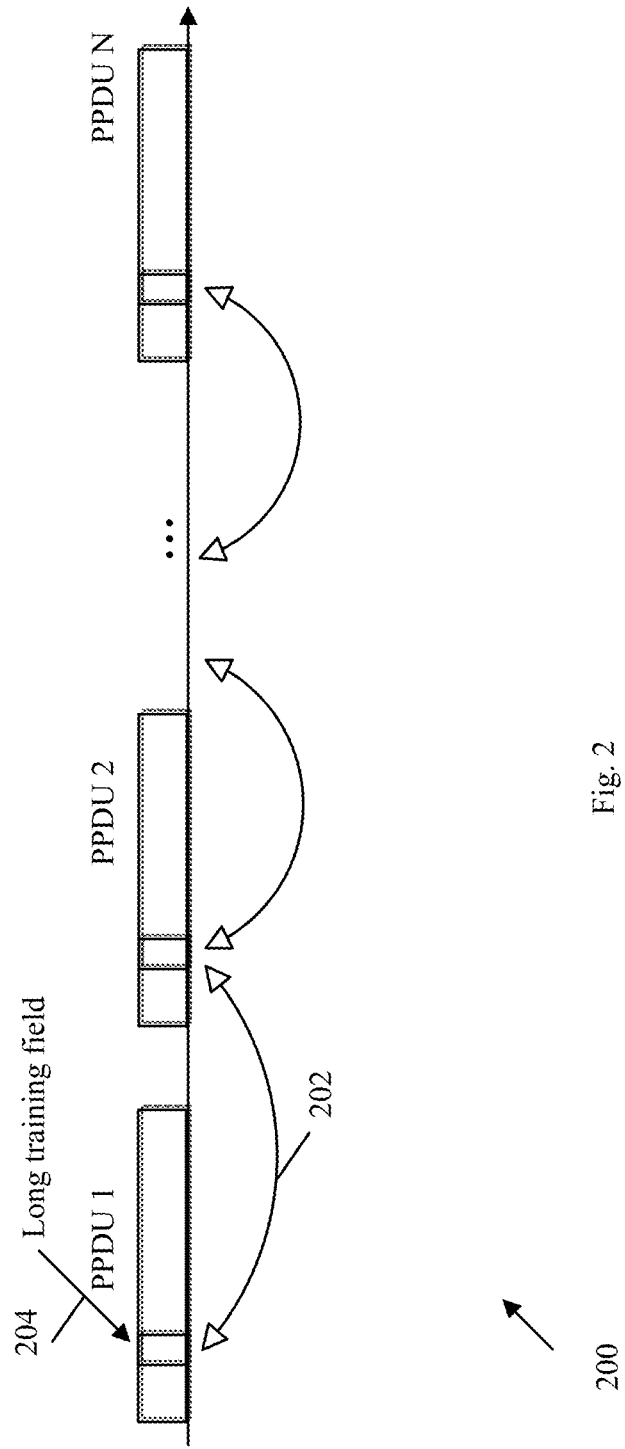
FIG. 2 is a schematic illustration of a plurality of Physical layer (PHY) Protocol Data Units (PPDUs), which may be utilized for wireless sensing in accordance with some demonstrative embodiments.

Reference is made to FIG. 2, which schematically illustrates a plurality of Physical layer (PHY) Protocol Data Units (PPDUs) 200, which may be utilized for wireless sensing in accordance with some demonstrative embodiments. For example, device 140 (FIG. 1) may transmit PPDUs 200, device 102 (FIG. 1) may receive the PPDUs 200 over a wireless communication channel, and WLAN sensor 110 (FIG. 1) may be configured to determine channel estimation measurements based on the PPDUs 200, which may be processed for detection of a change in an environment of the wireless communication channel.

In some demonstrative embodiments, WLAN sensor 110 (FIG. 1) may be configured to perform WLAN sensing by tracking channel estimates based on the received PPDUs over time, for example, in order to detect possible events of interest.

In some demonstrative embodiments, WLAN sensor 110 (FIG. 1) may be configured to determine the channel estimates based on one or more fields in the PPDUs 200, for example, based on an LTF 204.

In some demonstrative embodiments, as shown in FIG. 2, there may be a time interval 202 between consecutive channel estimation measurements on the PPDUs 200. The time interval may be pre-set and/or configured by a WLAN sensing implementation, e.g., according to one or more requirements of application 125.

In some demonstrative embodiments, the time interval 202 between consecutive channel estimation measurements may be configured to be long enough, for example, such that consecutive channel estimation measurements would likely be "different enough" to capture the event of interest. For example, the time interval 202 may be defined to include a time interval long enough to capture channel estimates, which may be different enough to indicate movement of an object or a person in a room.

In one example, PPDUs 200 may include beacon frames, which may be used for obtaining the channel estimates. According to this example, channel estimates may be expected to be obtained with a time interval 202 corresponding to a beacon interval, e.g., a time interval of 100 milliseconds (ms). This time interval may be sufficient, for example, to capture channel estimates, which may be different enough to indicate movement of an object or a person in a room.

In some demonstrative embodiments, there may be a need for a technical solution to increase and/or to improve a reliability and/or an accuracy of the wireless sensing, e.g., as described below.

In some demonstrative embodiments, it may be advantageous to distinguish between changes in a wireless communication channel, which result from an actual change in the environment, e.g., due to motion, and changes in the wireless communication channel, which result from other reasons, e.g., noise and/or the like.

In some demonstrative embodiments, motion in an environment, for example, as a person or object moves around a given environment, may impact how a WLAN signal, e.g., an IEEE 802.11 signal, propagates from a transmitter of the signal to a receiver of the signal. For example, propagation paths may be created and/or destructed, thereby generating time-varying multipath fading.

Reference is made to FIG. 3, which illustrates a graph 310 depicting channel estimates in a static environment, and a graph 320 depicting channel estimates in a dynamic environment, in accordance with some demonstrative embodiments.

For example, the graph 310 may represent the CFR amplitude as a function of subcarrier index with respect to channel estimates obtained based on PPDUs received in a static environment, e.g., with substantially no motion.

For example, the graph 320 may represent the CFR amplitude as a function of subcarrier index with respect to channel estimates obtained based on PPDUs received in a dynamic environment, e.g., with motion.

For example, the CFR amplitudes of graphs 310 and 320 may be based on multiple channel estimates obtained with PPDUs, e.g., PPDUs 200 (FIG. 2), received over a time period of several minutes, e.g., about 3 minutes. For example, a curve in graphs 310 and 320 may correspond to a PPDU.

For example, the curves of graph 310 may be obtained when there was no motion in the environment, and the curves of graph 310 may be obtained when there was motion in the environment, e.g., one person randomly walking in a room.

As shown in FIG. 3, even if there is no movement in the environment, e.g., as shown in graph 310, channel estimates obtained with multiple packets may not be identical, and may change, for example, due various imperfections (collectively referred to as "sensing noise"), for example, thermal noise, interference, background movement, and/or imperfections in the channel estimation process, among others. The effect of these phenomena may result in sensing noise, which may affect the channel estimation.

In some demonstrative embodiments, there may be a need for a technical solution to support efficient and/or accurate estimation of WLAN sensing noise, which may affect the channel estimates, for example, even when there is no activity/motion in the environment.

In some demonstrative embodiments, there may be a need for a technical solution to support efficient and/or accurate estimation of one or more statistics, e.g., mean value and/or standard deviation, which may characterize the sensing noise, for example, in order to effectively use the channel state estimates obtained with multiple packets, e.g., the PPDUs 200 (FIG. 2).

Referring back to FIG. 1, in some demonstrative embodiments, WLAN sensor 110 may be configured to perform calibration of the measurements used for the WLAN sensing, for example, the measurements on packets 200 (FIG. 2), e.g., as described below.

In some demonstrative embodiments, WLAN sensor 110 may be configured to calibrate the WLAN sensing, for example, by estimating statistics, e.g., mean value and/or standard deviation, of the measurements to be used for the WLAN sensing in different conditions, for example, in the absence of activity in the environment, e.g., as described below.

In some demonstrative embodiments, WLAN sensor 110 may be configured to determine one or more statistic parameters of the sensing noise, for example, the average power level of the sensing noise, a standard deviation of the sensing noise, and/or any other parameter, e.g., as described below.

In some demonstrative embodiments, WLAN sensor 110 may be configured to process the channel state estimates obtained with multiple packets, e.g., the PPDUs 200 (FIG. 2), for example, for WLAN sensing, based on the one or more statistic parameters of the sensing noise, e.g., as described below.

In some demonstrative embodiments, WLAN sensor 110 may be configured to set a detection threshold of the WLAN sensing, for example, based on the one or more statistic parameters of the sensing noise, e.g., as described below.

In some demonstrative embodiments, WLAN sensor 110 may be configured to combine sensing measurements obtained with multiple links, for example, based on the one or more statistic parameters of the sensing noise, e.g., as described below.

In some demonstrative embodiments, WLAN sensor 110 may be configured to calibrate a reference channel estimation, for example, to determine "how much channel change" should be expected when there is no motion, e.g., resulting from sensing noise only.

In some demonstrative embodiments, WLAN sensor 110 may be configured to utilize the reference channel estimation, for example, to classify and/or differentiate between a first hypothesis ("no motion") and a second hypothesis ("motion"). For example, WLAN sensor 110 may be configured to utilize the reference channel estimation to differentiate the "no motion" case from the motion case, which may be characterized by sensing noise in addition to channel variations caused by an external factor, e.g., movement.

In some demonstrative embodiments, WLAN sensor 110 may be configured to perform the WLAN sensing calibration, for example, even without the help of a user for performing a calibration process, e.g., as described below.

In some demonstrative embodiments, there may be a need to address a technical issue of allowing a WLAN sensing implementation to be aware of whether channel estimation measurements, e.g., CSIs, obtained with certain PPDUs are impacted or not by motion. For example, when a WLAN sensing-based home security application is turned on and requires calibration, the application may need to know whether or not the first CSIs it obtains correspond to the "no motion" hypothesis.

In some demonstrative embodiments, WLAN sensor 110 may be configured to perform WLAN sensing, for example, by obtaining channel estimation measurement, e.g., CSIs or any other channel estimation measurements, with respect to two different time intervals, e.g., as described below.

In some demonstrative embodiments, WLAN sensor 110 may be configured to perform WLAN sensing calibration, for example, by obtaining channel estimation measurements, e.g., CSIs or any other channel estimation measurements, with respect to a first time interval, e.g., as described below.

In some demonstrative embodiments, the first time interval ("calibration time interval") may be short enough, for example, such that changes in the channel estimation measurements, e.g., CSIs or any other channel estimation measurements, may be assumed to be due to the sensing noise, for example, and not due to changes in the environment, e.g., due to movement.

In one example, in case the calibration time interval in which consecutive CSIs are obtained is very short, e.g., 4 microseconds (µs), the changes to the CSI caused by motion, for example, a person walking through a room, may be negligible. For example, movement with a velocity of 1 meter per second (m/s) may result in a change of about 0.004 millimeter (mm) during the short time interval of 4 µs. Accordingly, it may be assumed that changes between two consecutive CSIs obtained with such a short time interval would correspond to sensing noise only.

In some demonstrative embodiments, WLAN sensor 110 may be configured to perform WLAN sensing measurements to be processed for detecting the change in the environment, for example, by obtaining channel estimation measurements, e.g., CSIs or any other channel estimation measurements, with respect to a second time interval, e.g., as described below.

In some demonstrative embodiments, the second time interval ("WLAN sensing time interval") may be long enough, for example, such that changes in the channel estimation measurements, e.g., CSIs or any other channel estimation measurements, may be assumed to be mainly due to changes in the environment, e.g., due to movement.

In one example, in case the time interval in which consecutive CSIs are obtained is relatively long, e.g., 100 ms, the changes to the CSI caused by motion, for example, a person walking through a room, may be noticeable. For example, movement with a velocity of 1 m/s may result in a change of about 10 centimeters (cm) during the long time interval of 100 mss. Accordingly, the longer second time interval may be acceptable to perform actual WLAN sensing, e.g., after calibration.

In some demonstrative embodiments, WLAN sensor 110 may be configured to implement a calibration procedure for WLAN sensing, which may support the estimation of sensing noise in a first time scale, e.g., as described below.

In some demonstrative embodiments, WLAN sensor 110 may be configured to implement a calibration procedure for WLAN sensing, which may be based on enabling a WLAN sensing receiver of device 102 to estimate the CSI, or any other channel estimation measurements, multiple times within the same PPDU, e.g., as described below.

In some demonstrative embodiments, WLAN sensor 110 may be configured to implement a calibration procedure for WLAN sensing, which may support the estimation of sensing noise in a first time scale different from a second time scale used for the detection, e.g., as described below.

In some demonstrative embodiments, WLAN sensor 110 may be configured to implement a calibration procedure for WLAN sensing, which may be based on a WLAN sensing protocol in which PPDUs are transmitted in bursts, which may be configured to allow for the CSI, or any other channel estimation measurements, to be estimated in a short time interval, for example, a time interval based on a Short Interframe Space (SIFS) plus a transmit time (TXTIME) of a PPDU used for the measurement, e.g., as described below.

In some demonstrative embodiments, WLAN sensor 110 may be configured to cause a first wireless communication device, e.g., device 102, to calibrate a reference channel estimation based on a plurality of first channel estimation measurements, e.g., as described below.

In some demonstrative embodiments, the reference channel estimation may be configured to represent the wireless communication channel when there is no change in the environment of the wireless communication channel, e.g., as described below.

In some demonstrative embodiments, the plurality of first channel estimation measurements may correspond to one or more first PPDUs received from a second wireless communication device, e.g., from device 140, over a wireless communication channel, e.g., as described below.

In some demonstrative embodiments, two consecutive channel estimation measurements of the plurality of first channel estimation measurements may separated by no more than a first time interval, e.g., as described below.

In some demonstrative embodiments, the one or more first PPDUs may include one or more calibration PPDUs from the second wireless communication device, e.g., as described below.

In some demonstrative embodiments, the one or more first PPDUs may include one or more Null-Data-Packets (NDPs) from the second wireless communication device, e.g., as described below.

In other embodiments, the one or more first PPDUs may include any other additional or alternative type of PPDUs.

In some demonstrative embodiments, WLAN sensor 110 may be configured to cause the first wireless communication device, e.g., device 102, to determine a plurality of second channel estimation measurements to be processed for detection of a change in an environment of the wireless communication channel based on the reference channel estimation, e.g., as described below.

In some demonstrative embodiments, the plurality of second channel estimation measurements may correspond to a plurality of second PPDUs received from the second wireless communication device, e.g., device 140, over the wireless communication channel, e.g., as described below.

In some demonstrative embodiments, two consecutive channel estimation measurements of the plurality of second channel estimation measurements may be separated by at least a second time interval, e.g., as described below.

In some demonstrative embodiments, the detection of the change in the environment of the wireless communication channel may include a detection of movement in the environment of the wireless communication channel, e.g., as described below.

In some demonstrative embodiments, for example, device 102 may include a processor, e.g., implemented as part of wireless sensing processor 110 and/or a processor configured to execute application 125, which may be configured to detect and classify the change in the environment of the wireless communication channel for WLAN sensing.

In some demonstrative embodiments, the processor e.g., implemented as part of wireless sensing processor 110 and/or a processor configured to execute application 125, may be configured to detect and classify the change in the environment of the wireless communication channel, for example, based on the plurality of second channel estimation measurements and the reference channel estimation.

In some demonstrative embodiments, the plurality of second PPDUs may include a plurality of NDPs from the second wireless communication device, for example, from device 140, e.g., as described below.

In some demonstrative embodiments, the plurality of second PPDUs may include a plurality of beacon frames from the second wireless communication device, e.g., as described below.

In other embodiments, the plurality of second PPDUs may include any other additional or alternative type of PPDUs.

In some demonstrative embodiments, the second time interval may be longer than the first time interval, e.g., as described below.

In some demonstrative embodiments, the first time interval may be no more than 100 microseconds, e.g., as described below.

In some demonstrative embodiments, the second time interval may be at least 100 times longer than the first time interval, e.g., as described below.

In some demonstrative embodiments, the second time interval may be at least 50 milliseconds, e.g., as described below.

In some demonstrative embodiments, the second time interval may be at 100 milliseconds, e.g., as described below.

In other embodiments, the first time interval and/or the second time interval may be configured to have any other duration.

In some demonstrative embodiments, the plurality of first channel estimation measurements and/or the plurality of second channel estimation measurements may include a plurality of Channel State Information (CSI) measurements, e.g., as described below.

In some demonstrative embodiments, the plurality of first channel estimation measurements and/or the plurality of second channel estimation measurements may include a plurality of Signal to Noise Ratio (SNR) measurements, e.g., as described below.

In some demonstrative embodiments, the plurality of first channel estimation measurements and/or the plurality of second channel estimation measurements may include a plurality of Received Signal Strength Indicator (RSSI) measurements, e.g., as described below.

In some demonstrative embodiments, the plurality of first channel estimation measurements and/or the plurality of second channel estimation measurements may include a plurality of Channel Frequency Response (CFR) measurements, e.g., as described below.

In some demonstrative embodiments, WLAN sensor 110 may be configured to cause device 102 to negotiate with device 140 one or more parameters to configure the one or more first PPDUs to be used for the plurality of first channel estimation measurements, e.g., as described below.

In some demonstrative embodiments, WLAN sensor 110 may be configured to cause device 102 to transmit to device 140 a message including an indication of one or more parameters to configure the one or more first PPDUs to be used for the plurality of first channel estimation measurements, e.g., as described below.

In some demonstrative embodiments, WLAN sensor 110 may be configured to cause device 102 to process a message from device 140 including an indication of one or more parameters to configure the one or more first PPDUs to be used for the plurality of first channel estimation measurements, e.g., as described below.

In some demonstrative embodiments, WLAN sensor 110 may be configured to cause device 102 to calibrate the reference channel estimation based on the plurality of first channel estimation measurements including a plurality of consecutive channel estimation measurements on symbols of a same PPDU, e.g., as described below.

In some demonstrative embodiments, the plurality of first channel estimation measurements may include first and second consecutive measurements corresponding to first and second respective symbols in a same PPDU, e.g., as described below.

In some demonstrative embodiments, WLAN sensor 110 may be configured to cause device 102 to negotiate with device 140 a count of symbols to be included per PPDU to be used for the plurality of first channel estimation measurements, e.g., as described below.

In some demonstrative embodiments, WLAN sensor 110 may be configured to cause device 102 to transmit to device 140 a message including an indication of a requested count of symbols to be included per PPDU to be used for the plurality of first channel estimation measurements, e.g., as described below.

In some demonstrative embodiments, WLAN sensor 110 may be configured to cause device 102 to process a message, which may be transmitted from device 140, including an indication of a supported count of symbols to be included per PPDU to be used for the plurality of first channel estimation measurements, e.g., as described below.

In some demonstrative embodiments, the first and second measurements corresponding to the first and second respective symbols in a same PPDU may correspond to first and second respective symbols in a same field of the same PPDU, e.g., as described below.

In some demonstrative embodiments, the first and second measurements corresponding to the first and second respective symbols in a same PPDU may correspond to first and second respective symbols in an LTF of the same PPDU, e.g., as described below.

In some demonstrative embodiments, the LTF may include a HT LTF of a HT PPDU, e.g., as described below.

In some demonstrative embodiments, the LTF may include a VHT LTF of a VHT PPDU, e.g., as described below.

In some demonstrative embodiments, the LTF may include an EHT LTF of an EHT PPDU, e.g., as described below.

In some demonstrative embodiments, the LTF may include an EDMG LTF of an EDMG PPDU, e.g., as described below.

In other embodiments, the LTF may include any other LTF, for example, an L-LTF, and/or any other field of any other PPDU type.

In some demonstrative embodiments, the first and second measurements corresponding to the first and second respective symbols in a same PPDU may correspond to first and second respective symbols in a Training (TRN) field of the same PPDU, e.g., as described below.

In some demonstrative embodiments, the first and second measurements corresponding to the first and second respective symbols in a same PPDU may correspond to first and second respective fields in the same PPDU.

In some demonstrative embodiments, the first time interval may be no more than 10 microseconds, for example, when using the plurality of symbols in a same PPDU for the calibration measurements, e.g., as described below.

In some demonstrative embodiments, the first time interval may be 4 microseconds, for example, when using the plurality of symbols in a same PPDU for the calibration measurements, e.g., as described below.

In other embodiments, any other duration maybe implemented for the first time interval.

Figure 4:
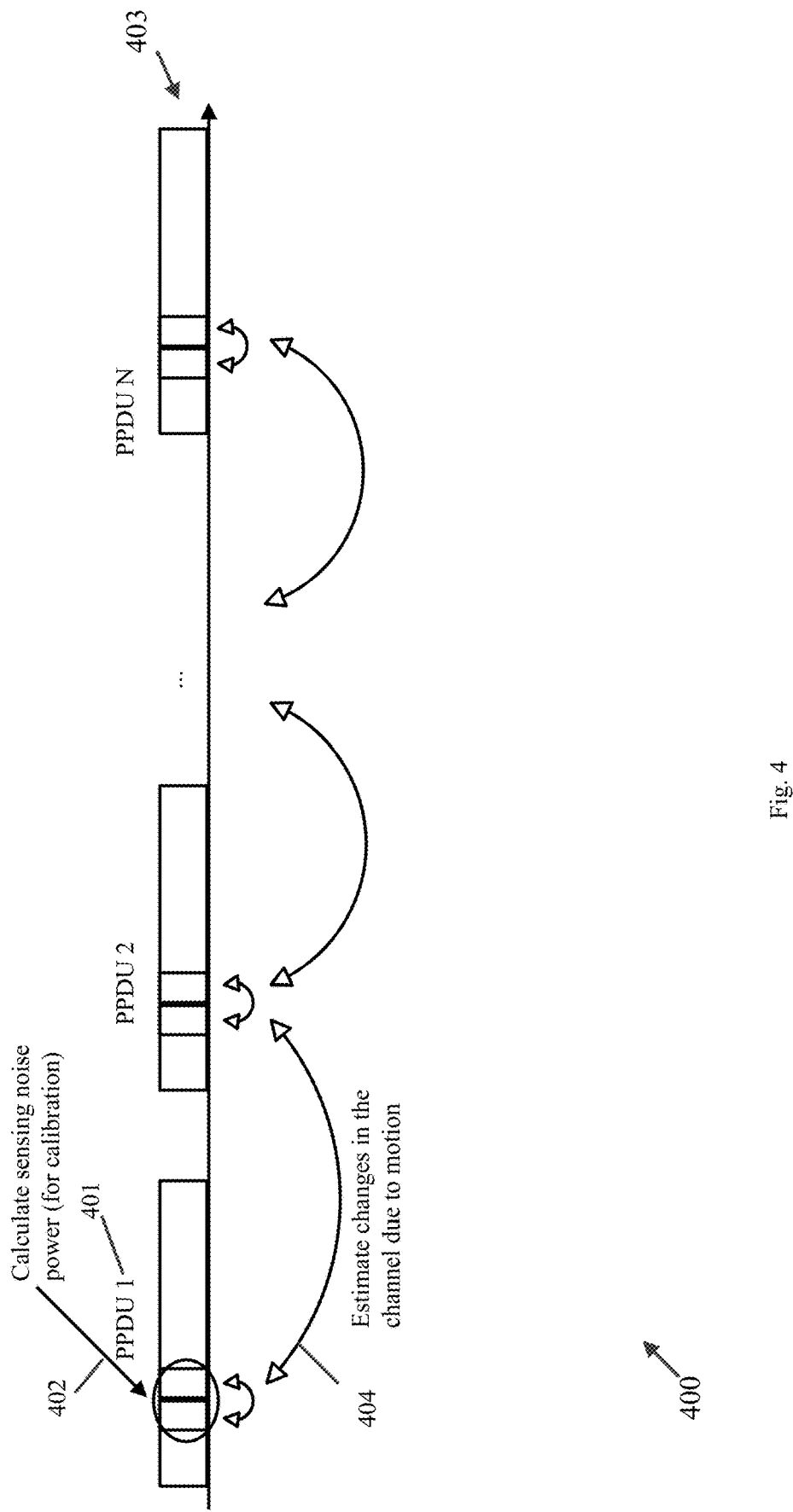
FIG. 4 is a schematic illustration of a calibration scheme to calibrate channel estimations, in accordance with some demonstrative embodiments.

Reference is made to FIG. 4, which schematically illustrates a calibration scheme 400 to calibrate a reference channel estimation, in accordance with some demonstrative embodiments. For example, device 140 (FIG. 1) may transmit PPDUs according to calibration scheme 400, and wireless sensing component 110 (FIG. 1) maybe configured to utilize calibration scheme 400 to process one or more fields of one or more PPDUs to calibrate a reference channel estimation for WLAN sensing.

In some demonstrative embodiments, statistics of the sensing noise, e.g., the mean value, the variance, and/or any other parameter corresponding to the sensing noise, may be estimated based on two or more channel estimates within the same PPDU.

In some demonstrative embodiments, for example, as shown in FIG. 4, WLAN sensor 110 (FIG. 1) may be configured to calibrate a reference channel estimation based on a plurality of first channel estimation measurements (also referred to as "intra-packet channel estimations") on a plurality of respective symbols 402 in a same PPDU 401.

In some demonstrative embodiments, the time interval in which the intra-packet channel estimations are obtained with respect to the symbols 402 in the same PPDU 401 may be relatively short, e.g., no more than 10 microseconds or any other interval.

Accordingly, even in case of motion in the environment, changes in the channel estimates due to motion would not be noticeable based on the intra-packet channel estimations obtained with respect to the symbols 402 in the same PPDU 401, e.g., as discussed above.

Therefore, changes in the intra-packet channel estimations obtained with respect to the symbols 402 in the same PPDU 401 may be assumed to correspond to the WLAN sensing noise, e.g., thermal noise, interference, and/or imperfections in the channel estimation process, among others.

In some demonstrative embodiments, the reference channel estimation may be calibrated to have a sensing noise power, which may be determined, for example, based on, e.g., equal to, the variance of the intra-packet channel estimations obtained with respect to the symbols 402 in the same PPDU 401.

In other embodiments, the reference channel estimation may be calibrated based on any other statistical parameter of the intra-packet channel estimations obtained with respect to the plurality of symbols 402 in the same PPDU 401.

In some demonstrative embodiments, WLAN sensor 110 (FIG. 1) may be configured to determine a plurality of second channel estimation measurements (also referred to as "inter-packet channel estimations") corresponding to a plurality of second PPDUs 403.

In some demonstrative embodiments, as shown in FIG. 4, the plurality of second PPDUs 403 may include some or all of the one or more first PPDUs 401 utilized for the WLAN sensing calibration, and/or one or more other PPDUs, which are not used for the calibration.

In some demonstrative embodiments, as shown in FIG. 4, two consecutive inter-packet channel estimations may be spaced by a time interval 404, which may be longer, e.g., much longer, than the time interval between the intra-packet channel estimations obtained with respect to the symbols 402 in the same PPDU 401.

In some demonstrative embodiments, WLAN sensing implementations, e.g., as may be implemented by WLAN sensor 110 (FIG. 1) and/or application 125 (FIG. 1), may be configured to perform WLAN sensing by comparing inter-packet channel estimations obtained with multiple packets 403 over time.

In some demonstrative embodiments, WLAN sensing implementations, e.g., as may be implemented by WLAN sensor 110 (FIG. 1) and/or application 125 (FIG. 1), may be configured to use the sensing noise power estimated with the intra packet channel estimates, for example, to determine if any possible changes observed with respect to the inter-packet channel estimations may correspond to "background noise" only or if they may indicate an event of interest e.g., someone walked into the house.

In some demonstrative embodiments, the intra-packet channel estimations may be performed based on a plurality of LTFs within the same PPDU, e.g., as described below.

In some demonstrative embodiments, the PPDUs for the intra-packet channel estimations may be configured to include multiple "symbols" that could be used to obtain multiple channel estimates. In one example, the PPDUs for the intra-packet channel estimations may be configured according to a PPDU configuration, which may support Multiple-Input-Multiple-Output (MIMO) transmissions, for example, according to the IEEE 802.11-2016 Specification and/or any other Specification.

Figure 5:
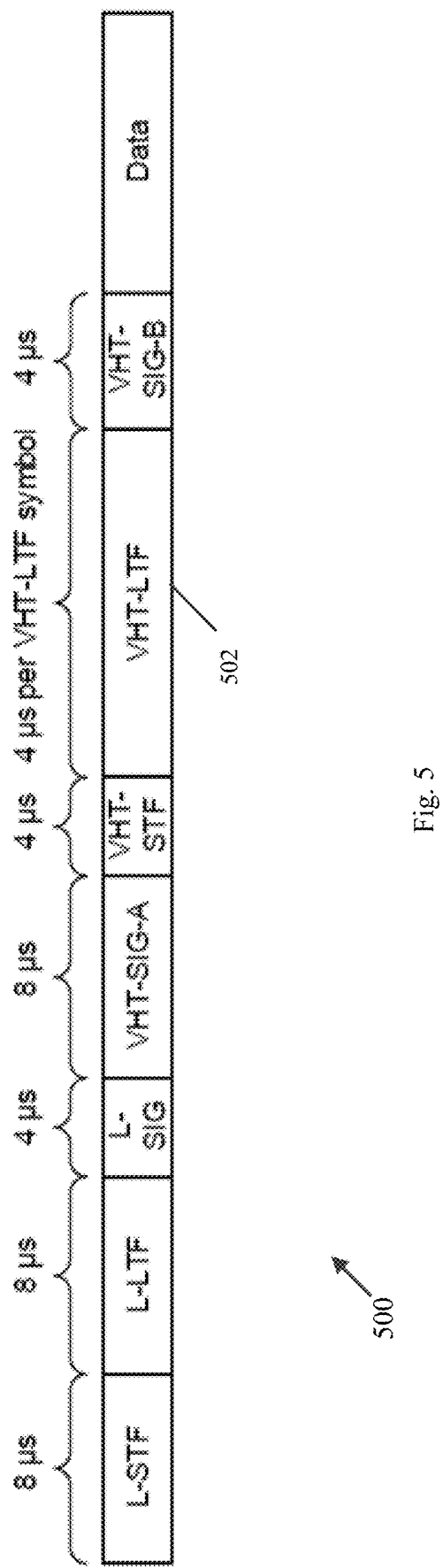
FIG. 5 is a schematic illustration of fields of a PPDU format, which may be implemented in accordance with some demonstrative embodiments.

FIG. 5 is a schematic illustration of fields of a PPDU format 500, which may be implemented in accordance with some demonstrative embodiments. For example, PPDU format may be implemented for a VHT PPDU, e.g., in compliance with the IEEE 802.11-2016 Specification.

In one example, device 140 (FIG. 1) may be configured to transmit PPDUs configured according to PPDU format 500.

In one example, WLAN sensor 110 (FIG. 1) may be configured to calibrate a reference channel estimation based on a plurality of intra-packet channel estimations on a plurality of respective symbols in a PPDU configured according to PPDU format 500.

In other embodiments, any other PPDU format may be used.

For example, as shown in FIG. 5, a VHT PPDU may include a VHT-LTF 502, which may be configured for channel estimation. The VHT-LTF 502 may be configured to include one or more VHT-LTF symbols.

In one example, the number of symbols found in a channel estimation field, e.g., the VHT-LTF 502 may be defined by the number of space-time streams in a transmission of the VHT PPDU, e.g., in accordance with the IEEE 802.11-2016 Specification. For example, the number of VHT-LTF symbols may be 2 for a VHT PPDU having two space-time streams.

In some demonstrative embodiments, the VHT field 502 of PPDU format 500 may be configured to support a WLAN sensing application, e.g., as described below.

In some demonstrative embodiments, the VHT field 502 of PPDU format 500 may be configured to support transmission of a count of VHT LTF symbols, which may be defined and/or required to support WLAN sensing. For example, a number of symbols in the VHT LTF 502 may be defined independent of and/or regardless of, of the number of space-time streams. For example, the VHT PPDU may be configured to transmit in VHT LTF 502 a number of symbols that is not a function of the number of space-time streams.

In some demonstrative embodiments, devices configured to support WLAN sensing, e.g., device 102 (FIG. 1) and/or device 140 (FIG. 1), may be configured to support indication of and/or negotiation of, the number of LTF symbols to be utilized in the transmission of VHT LTF 502, e.g., regardless of, and/or independent of, the number of space-time streams to be used.

In some demonstrative embodiments, wireless sensing component 110 (FIG. 1) may be configured to cause device 102 (FIG. 1) to transmit a message, e.g., a request message and/or an advertisement message, which may be configured to indicate a requested count of symbols, e.g., a count of symbols in VHT LTF 502, to be included per PPDU to be used for intra-packet channel estimation measurements. In one example, the requested count of symbols may be indicated as part of a capability Information Element (IE) or field, and/or any other IE and/or field.

In some demonstrative embodiments, device 140 (FIG. 1) may be configured to transmit a message, e.g., a response message and/or an advertisement message, which may be configured to indicate a supported count of symbols, e.g., a count of symbols in VHT LTF 502, to be included by device 140 (FIG. 1) per PPDU to be used for intra-packet channel estimation measurements. In one example, the supported count of symbols may be indicated as part of a capability Information Element (IE) or field, and/or any other IE and/or field.

In some demonstrative embodiments, wireless sensing component 110 (FIG. 1) may be configured to process the message from device 140 (FIG. 1) to determine the supported count of symbols, e.g., a count of symbols in VHT LTF 502, per PPDU to be used by device 102 for the intra-packet channel estimation measurements.

In some demonstrative embodiments, device 102 (FIG. 1) and/or device 140 (FIG. 1) may be configured to negotiate count of symbols, e.g., a count of symbols in VHT LTF 502, to be included per PPDU to be used for intra-packet channel estimation measurements, for example, as part of a WLAN sensing setup and/or as part of any other negotiation procedure.

In some demonstrative embodiments, wireless sensing component 110 (FIG. 1) may be configured to cause device 102 (FIG. 1) to transmit a request message to request a number of LTF symbols per PPDU, and device 104 (FIG. 1) may transmit a response to device 102.

In one example, the response may include an Acknowledgement (ACK) message to indicate that the requested number of LTF symbols per PPDU is approved or acknowledged. In another example, device 140 (FIG. 1) may transmit a response indicating an approved number of LTF symbols per PPDU, e.g., which may be equal to or different from the requested number of LTF symbols per PPDU.

In some demonstrative embodiments, a WLAN sensing set-up and/or negotiation procedure between two STAs that perform WLAN sensing, e.g., devices 102 and 140 (FIG. 1), may include an exchange of a request message and a response message to negotiate the number of symbols to be present in one or more PPDUs, e.g., in each PPDU, transmitted as part of the WLAN sensing procedure.

In some demonstrative embodiments, the number of symbols that a given STA could include per PPDU, e.g., the configurations supported by the STA, may be indicated in a capabilities IE and/or field.

In some demonstrative embodiments, a MAC and/or PHY of the STA, e.g., device 102 (FIG. 1) and/or device 140 (FIG. 1), may configure the number of symbols to be present in a PPDU, e.g., in each PPDU for intra-packet channel estimation, for example, independently of the number of space-time streams used for transmission of the PPDU.

In some demonstrative embodiments, for example, the PHY of the transmitter of the PPDU, e.g., device 140 (FIG. 1), may be configured to transmit fields used for channel estimation with a different, e.g., configurable, number of symbols, for example, as may be defined through the MAC/PHY interface, e.g., based on WLAN sensing requirements.

In some demonstrative embodiments, the intra-packet channel estimation measurements may be performed with respect to a VHT PPDU including a VHT-LTF field and VHT-LTF symbols, e.g., the VHT LTF 502 of the PPDU format 500, as described above.

In other embodiments, any other suitable configuration of the PPDU may be utilized to support a receiver, e.g., device 102 (FIG. 1), in obtaining multiple intra-packet channel estimates, e.g., based on processing a single PPDU. In one example, in addition to, or instead of, increasing the number of "symbols" within the LTF field of a PPDU, the LTF field may be transmitted multiple times. In another example, a new channel estimation field may be defined, for example, at the end of the PPDU, e.g., similar to a TRN field in DMG/EDMG PPDUs, which may be used for WLAN sensing purposes, e.g., may be dedicated for WLAN sensing purposes only, or may be shared for other purposes.

In some demonstrative embodiments, the intra-packet channel estimation measurements may be performed based on a TRN field of the PPDU. In one example, the use of the TRN field may support the intra-packet WLAN sensing calibration, for example, while maintaining a compliance with IEEE 802.11ad/ay systems.

In some demonstrative embodiments, the TRN field may include multiple repetitions of the same sequence (symbol), e.g., in order to support DMG/EDMG stations in performing transmit and/or receive beamforming training.

In some demonstrative embodiments, wireless sensing component 110 (FIG. 1) may be configured to utilize the multiple repetitions of the sequence of the TRN field to obtain multiple channel estimates within the same PPDU.

Referring back to FIG. 1, WLAN sensor 110 may be configured to cause device 102 to calibrate the reference channel estimation based on the plurality of first channel estimation measurements including a plurality of measurements on a plurality of PPDUs in a burst of PPDUs, e.g., as described below.

In some demonstrative embodiments, two consecutive channel estimation measurements of the plurality of first channel estimation measurements may include at least first and second measurements corresponding to first and second respective PPDUs in a burst of PPDUs, e.g., as described below.

In some demonstrative embodiments, two consecutive PPDUs in the burst of PPDUs may be separated, for example, by no more than a Short Inter Frame Space (SIFS) time. In other embodiments any other time interval may be implemented between the PPDUs in the burst of PPDUs.

In some demonstrative embodiments, the use of the burst of PPDUs for the WLAN sensing calibration may provide a technical advantage, for example, to support WLAN sensing calibration, even without requiring any substantial changes to a PHY configuration of devices 102 and/or 140.

In some demonstrative embodiments, WLAN sensor 110 may be configured to cause device 102 to negotiate with a second wireless communication device, e.g., device 140, one or more parameters corresponding to the burst of PPDUs, e.g., as described below.

In some demonstrative embodiments, WLAN sensor 110 may be configured to cause device 102 to transmit to the second wireless communication device, e.g., device 140, a message including an indication of one or more parameters corresponding to the burst of PPDUs, e.g., as described below.

In some demonstrative embodiments, WLAN sensor 110 may be configured to cause device 102 to process a message from the second wireless communication device, e.g., device 140, including an indication of one or more parameters corresponding to the burst of PPDUs, e.g., as described below.

In some demonstrative embodiments, the one or more parameters corresponding to the burst of PPDUs may include, for example, at least one of a count of PPDUs in the burst of PPDUs, a time interval between the two consecutive PPDUs in the burst of PPDUs, a time interval between consecutive bursts of PPDUs, and/or a count of bursts of PPDUs. In other embodiments, any other additional or alternative parameters may be used.

Figure 6:
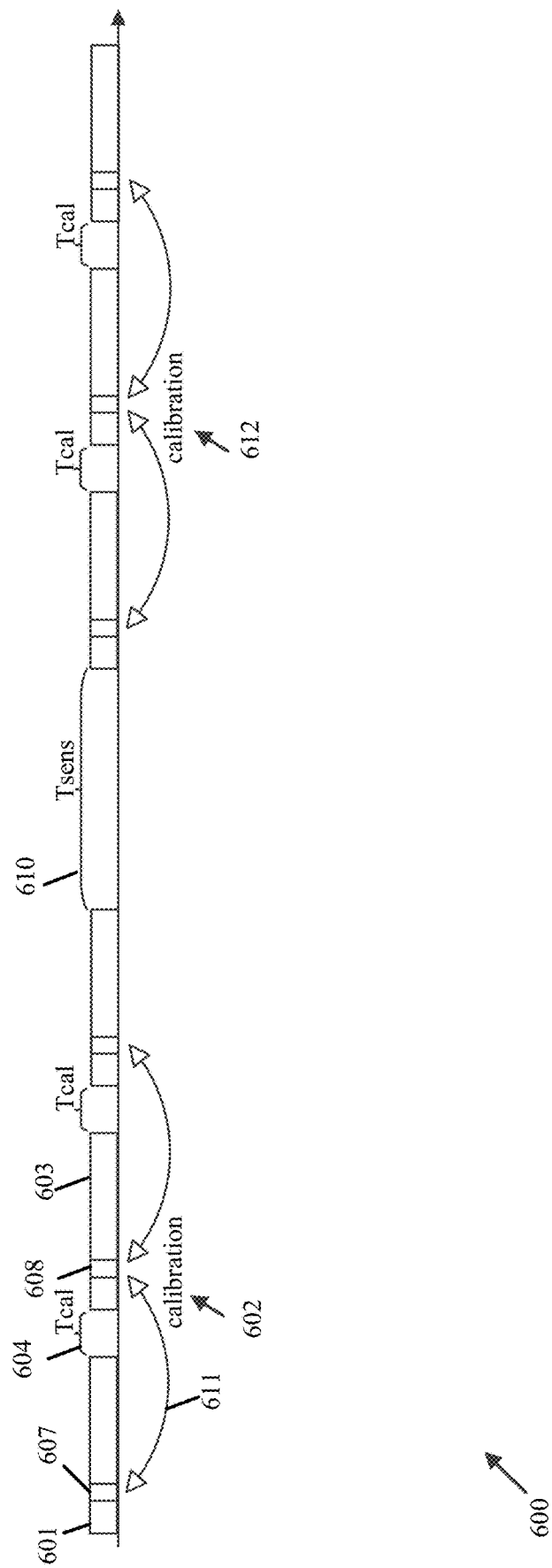
FIG. 6 is a schematic illustration of a calibration scheme to calibrate channel estimations, in accordance with some demonstrative embodiments.

Reference is made to FIG. 6, which schematically illustrates a calibration scheme 600 to calibrate a reference channel estimation, in accordance with some demonstrative embodiments. For example, device 140 (FIG. 1) may transmit PPDUs according to calibration scheme 600, and wireless sensing component 110 (FIG. 1) maybe configured to utilize calibration scheme 600 to process one or more fields of one or more PPDUs to calibrate a reference channel estimation for WLAN sensing.

In some demonstrative embodiments, a first STA ("transmitter STA"), e.g., device 140 (FIG. 1), may be configured to transmit bursts of PPDUs, e.g., where a burst of PPDUs includes PPDUs separated by a first time interval, denoted $T_{cal}$, which may be configured to support WLAN sensing calibration.

In some demonstrative embodiments, for example, the time interval $T_{cal}$ may be configured to be no longer than a SIFS, or any other interval.

In some demonstrative aspects, as shown in FIG. 6, different bursts of PPDUs may be separated by a second time interval, denoted $T_{sens}$, which may be configured to support WLAN sensing measurements.

In some demonstrative embodiments, the second time interval $T_{sens}$ may be longer than the first time interval $T_{cal}$.

For example, the first time interval $T_{cal}$ may be configured to be short enough to support consecutive channel estimation measurements for estimation the WLAN sensing noise, e.g., as described above.

For example, the second time interval $T_{sens}$ may be configured to be long enough to support consecutive channel estimation measurements for detection of changes in the environment, e.g., as described above.

In some demonstrative embodiments, as shown in FIG. 6, a first PPDU burst 602 may include a first plurality of PPDUs separated by the first time interval $T_{cal}$; and/or a second PPDU burst 612 may include a first plurality of PPDUs separated by the first time interval $T_{cal}$. For example, as shown in FIG. 6, the second PPDU burst 612 may be separated from the first PPDU burst 602 by the second time interval $T_{sens}$.

In some demonstrative embodiments, a second STA ("receiver STA" or "WLAN sensing STA"), e.g., device 102 (FIG. 1), may be configured to receive and process the bursts of PPDUs, for example, to perform inter-PPDU channel estimation measurements.

In some demonstrative embodiments, WLAN sensor 110 (FIG. 1) may be configured to perform WLAN sensing calibration, for example, by obtaining channel estimation measurements, e.g., CSIs or any other channel estimation measurements, with respect to a calibration time interval 611. For example, as shown in FIG. 6, WLAN sensor 110 (FIG. 1) may be configured to perform WLAN sensing calibration, for example, based on obtained inter-packet channel estimation measurements including a first channel estimation measurement on a field 607, e.g., an LTF, a TRN field or any other field, of a first PPDU 601 in the PPDU burst 602, and a second channel estimation measurement on a field 608, e.g., an LTF, a TRN field or any other field, of a second PPDU 603 in the PPDU burst 602.

In some demonstrative embodiments, devices configured to support WLAN sensing, e.g., device 102 (FIG. 1) and/or device 140 (FIG. 1), may be configured to support indication of and/or negotiation of one or more parameters corresponding to the burst of PPDUs, e.g., according to calibration scheme 600.

In some demonstrative embodiments, wireless sensing component 110 (FIG. 1) may be configured to cause device 102 (FIG. 1) to transmit a message, e.g., a request message and/or an advertisement message, which may be configured to indicate one or more requested parameters ("burst parameters") corresponding to the burst of PPDUs, e.g., according to calibration scheme 600, to be used for inter-packet channel estimation measurements. In one example, the requested burst parameters may be indicated as part of a capability Information Element (IE) or field, and/or any other IE and/or field.

In some demonstrative embodiments, device 140 (FIG. 1) may be configured to transmit a message, e.g., a response message and/or an advertisement message, which may be configured to indicate one or more supported burst parameters corresponding to the burst of PPDUs, e.g., according to calibration scheme 600, to be used for inter-packet channel estimation measurements. In one example, the supported burst parameters may be indicated as part of a capability Information Element (IE) or field, and/or any other IE and/or field.

In some demonstrative embodiments, wireless sensing component 110 (FIG. 1) may be configured to process the message from device 140 (FIG. 1) to determine the burst parameters for the inter-packet channel estimation measurements.

In some demonstrative embodiments, device 102 (FIG. 1) and/or device 140 (FIG. 1) may be configured to negotiate the burst parameters corresponding to the burst of PPDUs, e.g., according to calibration scheme 600, to be used for inter-packet channel estimation measurements, for example, as part of a WLAN sensing setup and/or as part of any other negotiation procedure.

In some demonstrative embodiments, wireless sensing component 110 (FIG. 1) may be configured to cause device 102 (FIG. 1) to transmit a request message to request to setup the PPDU burst according to one or more burst parameters, and device 104 (FIG. 1) may transmit a response to device 102. In one example, the response may include an Acknowledgement (ACK) message to indicate that the requested burst parameters are approved or acknowledged. In another example, device 140 (FIG. 1) may transmit a response indicating one or more approved burst parameters, e.g., which may be equal to or different from the requested burst parameters.

In some demonstrative embodiments, the one or more burst parameters that a given STA could support, e.g., the configurations supported by the STA, may be indicated in a capabilities IE and/or field.

In some demonstrative embodiments, a WLAN sensing set-up/negotiation procedure between two STAs that perform WLAN sensing may include an exchange of a request and response to define one or more of, e.g., some or more of, the following burst parameters:

Number of PPDUs to be present in each "calibration burst";

Time interval between PPDUs within each burst. In one example, if this information is not defined in the set-up/negotiation, the value may be set/fixed to a predefined value, e.g., SIFS;

Time interval between calibration bursts ($T_{sens}$); and/or

Number of bursts.

In some demonstrative embodiments, a MAC of the transmitter STA, e.g., a MAC of device 140, may be configured to trigger the PPDU burst transmissions with the desired calibration parameters, and/or other potential PHY parameters, which may be defined in the set-up/negotiation of the procedure.

Figure 7:
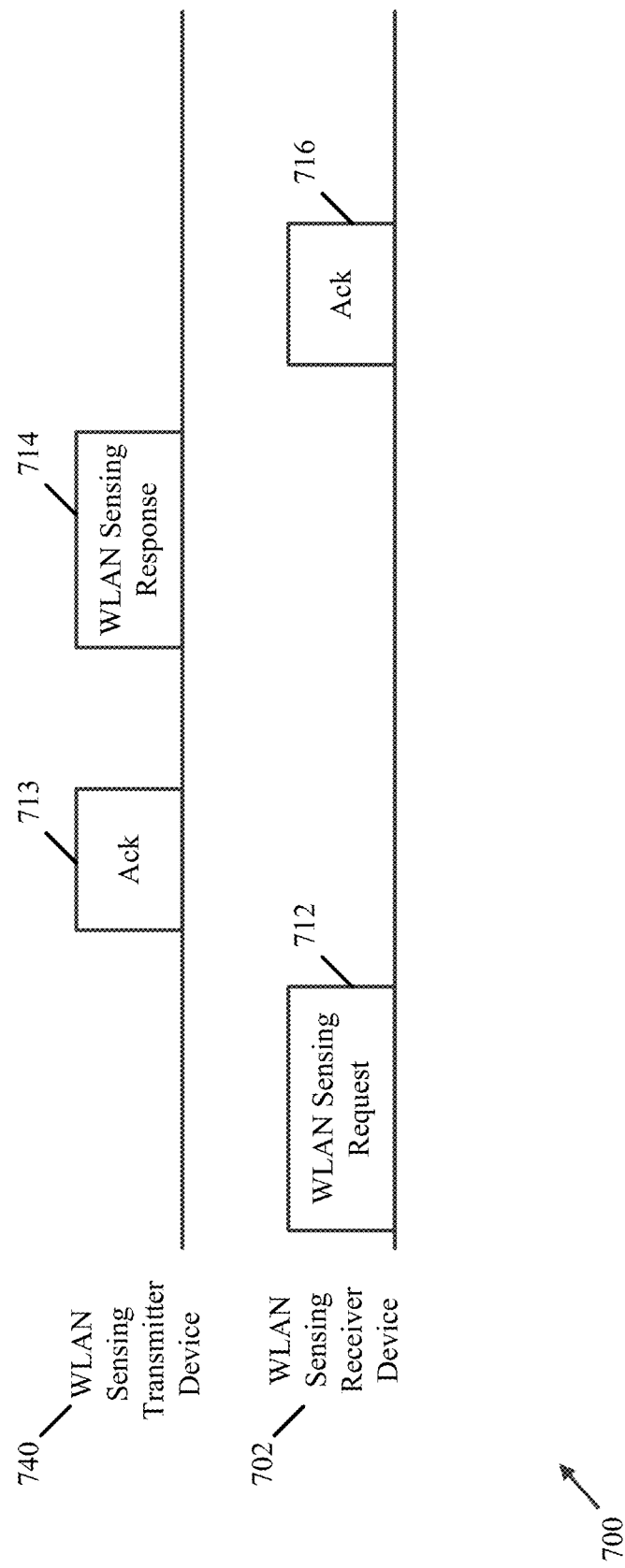
FIG. 7 is a schematic illustration of a negotiation procedure, in accordance with some demonstrative embodiments.

FIG. 7 is a schematic illustration of a negotiation procedure 700, in accordance with some demonstrative embodiments. For example, device 102 (FIG. 1) and/or device 140 (FIG. 1) may be configured to generate, transmit, receive and/or process one or more messages of the negotiation procedure 700 to negotiate and/or setup WLAN sensing.

In some demonstrative embodiments, a first device ("WLAN sensing receiver device") 702 may be configured to transmit to a second device "WLAN sensing transmitter device") 740 a request 712 to set-up one or more parameters for WLAN sensing. For example, device 102 (FIG. 1) may perform one or more functionalities of, and/or a role of, WLAN sensing receiver device 702; and/or device 140 (FIG. 1) may perform one or more functionalities of, and/or a role of, WLAN sensing transmitter device 740.

In some demonstrative embodiments, the request 712 may include a request to configure PPDUs for intra-packet channel estimation measurements, for example, according to the calibration scheme 400 (FIG. 4), e.g., as described above.

In some demonstrative embodiments, the request 712 may include a request to configure PPDUs for inter-packet channel estimation measurements, for example, according to the calibration scheme 600 (FIG. 6), e.g., as described above.

In some demonstrative embodiments, WLAN sensing transmitter device 740 may transmit an ACK 713 to the WLAN sensing receiver device 702, for example, to acknowledge the request 712. In other embodiments, the ACK 713 may be omitted.

In some demonstrative embodiments, WLAN sensing transmitter device 740 may transmit a response 714 to WLAN sensing receiver device 702. For example, the response 714 may include an indication on whether or not the request to configure the PPDUs for the channel estimation measurements is approved. Additionally, or alternatively, the response 714 may include an indication of a configuration or setting, of the PPDUs to be transmitted by the WLAN sensing transmitter device 740.

In some demonstrative embodiments, WLAN sensing receiver device 702 may transmit an ACK 716 to the WLAN sensing transmitter device 740, for example, to acknowledge the response 714. In other embodiments, the ACK 716 may be omitted.

Reference is made to FIG. 8, which schematically illustrates a method of wireless sensing, in accordance with some demonstrative embodiments. For example, one or more operations of the method of FIG. 8 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a wireless sensing component, e.g., wireless sensing component 110 (FIG. 1), an application, e.g., application 125 (FIG. 1), a radio, e.g., radio 114 (FIG. 1), a receiver, e.g., receiver 116 (FIG. 1), and/or a message processor, e.g., message processor 128 (FIG. 1), and/or message processor 158 (FIG. 1).

As indicated at block 802, the method may include calibrating at a first wireless communication device a reference channel estimation based on a plurality of first channel estimation measurements, the plurality of first channel estimation measurements corresponding to one or more first PPDUs received from a second wireless communication device over a wireless communication channel, wherein two consecutive channel estimation measurements of the plurality of first channel estimation measurements are separated by no more than a first time interval. For example, wireless sensing component 110 (FIG. 1) may be configured to calibrate the reference channel estimation based on the plurality of first channel estimation measurements corresponding to the one or more first PPDUs received from device 140 (FIG. 1), e.g., as described above.

As indicated at block 804, the method may include determining at the first wireless communication device a plurality of second channel estimation measurements to be processed for detection of a change in an environment of the wireless communication channel based on the reference channel estimation, wherein the plurality of second channel estimation measurements corresponds to a plurality of second PPDUs received from the second wireless communication device over the wireless communication channel, wherein two consecutive channel estimation measurements of the plurality of second channel estimation measurements are separated by at least a second time interval, the second time interval is longer than the first time interval. For example, wireless sensing component 110 (FIG. 1) may be configured to determine the plurality of second channel estimation measurements corresponding to the plurality of second PPDUs received from device 140 (FIG. 1), e.g., as described above.

Figure 9:
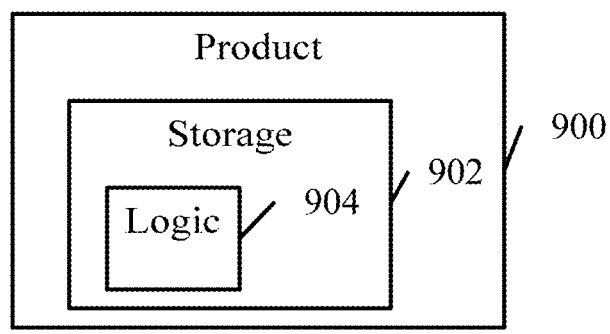
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), radio 114 (FIG. 1), receiver 116 (FIG. 1), transmitter 118 (FIG. 1), wireless sensing component 110 (FIG. 1), application 125 (FIG. 1), controller 124 (FIG. 1), controller 154 (FIG. 1), message processor 128 (FIG. 1), and/or message processor 158 (FIG. 1); to cause device 102 (FIG. 1), device 140 (FIG. 1), radio 114 (FIG. 1), receiver 116 (FIG. 1), transmitter 118 (FIG. 1), wireless sensing component 110 (FIG. 1), application 125 (FIG. 1), controller 124 (FIG. 1), controller 154 (FIG. 1), message processor 128 (FIG. 1), and/or message processor 158 (FIG. 1) to perform, trigger and/or implement one or more operations and/or functionalities, and/or to perform, trigger and/or implement one or more operations and/or functionalities, described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless communication device to calibrate a reference channel estimation based on a plurality of first channel estimation measurements, the plurality of first channel estimation measurements corresponding to one or more first Physical layer (PHY) Protocol Data Units (PPDUs) received from a second wireless communication device over a wireless communication channel, wherein two consecutive channel estimation measurements of the plurality of first channel estimation measurements are separated by no more than a first time interval; and determine a plurality of second channel estimation measurements to be processed for detection of a change in an environment of the wireless communication channel based on the reference channel estimation, wherein the plurality of second channel estimation measurements corresponds to a plurality of second PPDUs received from the second wireless communication device over the wireless communication channel, wherein two consecutive channel estimation measurements of the plurality of second channel estimation measurements are separated by at least a second time interval, the second time interval is longer than the first time interval.

Example 2 includes the subject matter of Example 1, and optionally, wherein the two consecutive channel estimation measurements of the plurality of first channel estimation measurements comprise first and second measurements corresponding to first and second respective symbols in a same PPDU.

Example 3 includes the subject matter of Example 2, and optionally, wherein the apparatus is configured to cause the first wireless communication device to negotiate with the second wireless communication device a count of symbols to be included per PPDU to be used for the plurality of first channel estimation measurements.

Example 4 includes the subject matter of Example 2 or 3, and optionally, wherein the apparatus is configured to cause the first wireless communication device to transmit to the second wireless communication device a message comprising an indication of a requested count of symbols to be included per PPDU to be used for the plurality of first channel estimation measurements.

Example 5 includes the subject matter of any one of Examples 2-4, and optionally, wherein the apparatus is configured to cause the first wireless communication device to process a message from the second wireless communication device, the message from the second wireless communication device comprising an indication of a supported count of symbols to be included per PPDU to be used for the plurality of first channel estimation measurements.

Example 6 includes the subject matter of any one of Examples 2-5, and optionally, wherein the first and second measurements correspond to first and second respective symbols in a same field of the same PPDU.

Example 7 includes the subject matter of any one of Examples 2-5, and optionally, wherein the first and second measurements correspond to first and second respective symbols in a Long Training Field (LTF) of the same PPDU.

Example 8 includes the subject matter of Example 7, and optionally, wherein the LTF comprises a High Throughput (HT) LTF of a HT PPDU.

Example 9 includes the subject matter of Example 7, and optionally, wherein the LTF comprises a Very-High Throughput (VHT) LTF of a VHT PPDU.

Example 10 includes the subject matter of Example 7, and optionally, wherein the LTF comprises an Extremely-High Throughput (EHT) LTF of an EHT PPDU.

Example 11 includes the subject matter of Example 7, and optionally, wherein the LTF comprises an Enhanced Directional Multi-Gigabit (EDMG) LTF of an EDMG PPDU.

Example 12 includes the subject matter of any one of Examples 2-5, and optionally, wherein the first and second measurements correspond to first and second respective symbols in a Training (TRN) field of the same PPDU.

Example 13 includes the subject matter of any one of Examples 2-5, and optionally, wherein the first and second measurements correspond to first and second respective fields in the same PPDU.

Example 14 includes the subject matter of any one of Examples 2-13, and optionally, wherein the first time interval is no more than 10 microseconds.

Example 15 includes the subject matter of any one of Examples 2-14, and optionally, wherein the first time interval is 4 microseconds.

Example 16 includes the subject matter of Example 1, and optionally, wherein the two consecutive channel estimation measurements of the plurality of first channel estimation measurements comprise first and second measurements corresponding to first and second respective PPDUs in a burst of PPDUs, wherein two consecutive PPDUs in the burst of PPDUs are separated by no more than a Short Inter Frame Space (SIFS) time.

Example 17 includes the subject matter of Example 16, and optionally, wherein the apparatus is configured to cause the first wireless communication device to negotiate with the second wireless communication device one or more parameters corresponding to the burst of PPDUs.

Example 18 includes the subject matter of Example 16 or 17, and optionally, wherein the apparatus is configured to cause the first wireless communication device to transmit to the second wireless communication device a message comprising an indication of one or more parameters corresponding to the burst of PPDUs.

Example 19 includes the subject matter of any one of Examples 16-18, and optionally, wherein the apparatus is configured to cause the first wireless communication device to process a message from the second wireless communication device, the message from the second wireless communication device comprising an indication of one or more parameters corresponding to the burst of PPDUs.

Example 20 includes the subject matter of any one of Examples 17-19, and optionally, wherein the one or more parameters corresponding to the burst of PPDUs comprise at least one of a count of PPDUs in the burst of PPDUs, a time interval between the two consecutive PPDUs in the burst of PPDUs, a time interval between consecutive bursts of PPDUs, or a count of bursts of PPDUs.

Example 21 includes the subject matter of any one of Examples 1-20, and optionally, wherein the apparatus is configured to cause the first wireless communication device to negotiate with the second wireless communication device one or more parameters to configure the one or more first PPDUs to be used for the plurality of first channel estimation measurements.

Example 22 includes the subject matter of any one of Examples 1-21, and optionally, wherein the apparatus is configured to cause the first wireless communication device to transmit to the second wireless communication device a message comprising an indication of one or more parameters to configure the one or more first PPDUs to be used for the plurality of first channel estimation measurements.

Example 23 includes the subject matter of any one of Examples 1-22, and optionally, wherein the apparatus is configured to cause the first wireless communication device to process a message from the second wireless communication device, the message from the second wireless communication device comprising an indication of one or more parameters to configure the one or more first PPDUs to be used for the plurality of first channel estimation measurements.

Example 24 includes the subject matter of any one of Examples 1-23, and optionally, wherein the first time interval is no more than 100 microseconds.

Example 25 includes the subject matter of any one of Examples 1-24, and optionally, wherein the second time interval is at least 100 times longer than the first time interval.

Example 26 includes the subject matter of any one of Examples 1-25, and optionally, wherein the second time interval is at least 50 milliseconds.

Example 27 includes the subject matter of any one of Examples 1-26, and optionally, wherein the second time interval is at 100 milliseconds.

Example 28 includes the subject matter of any one of Examples 1-27, and optionally, wherein the reference channel estimation is configured to represent the wireless communication channel when there is no change in the environment of the wireless communication channel.

Example 29 includes the subject matter of any one of Examples 1-28, and optionally, wherein the detection of the change in the environment of the wireless communication channel comprises a detection of movement in the environment of the wireless communication channel.

Example 30 includes the subject matter of any one of Examples 1-29, and optionally, wherein the plurality of first channel estimation measurements and the plurality of second channel estimation measurements comprise a plurality of Channel State Information (CSI) measurements.

Example 31 includes the subject matter of any one of Examples 1-30, and optionally, wherein the plurality of first channel estimation measurements and the plurality of second channel estimation measurements comprise a plurality of Signal to Noise Ratio (SNR) measurements.

Example 32 includes the subject matter of any one of Examples 1-31, and optionally, wherein the plurality of first channel estimation measurements and the plurality of second channel estimation measurements comprise a plurality of Received Signal Strength Indicator (RSSI) measurements.

Example 33 includes the subject matter of any one of Examples 1-32, and optionally, wherein the plurality of first channel estimation measurements and the plurality of second channel estimation measurements comprise a plurality of Channel Frequency Response (CFR) measurements.

Example 34 includes the subject matter of any one of Examples 1-33, and optionally, wherein the one or more first PPDUs comprise one or more calibration PPDUs from the second wireless communication device.

Example 35 includes the subject matter of any one of Examples 1-34, and optionally, wherein the one or more first PPDUs comprise one or more Null-Data-Packets (NDPs) from the second wireless communication device.

Example 36 includes the subject matter of any one of Examples 1-35, and optionally, wherein the plurality of second PPDUs comprises a plurality of Null-Data-Packets (NDPs) from the second wireless communication device.

Example 37 includes the subject matter of any one of Examples 1-36, and optionally, wherein the plurality of second PPDUs comprises a plurality of beacon frames from the second wireless communication device.

Example 38 includes the subject matter of any one of Examples 1-37 and optionally, comprising a processor configured to detect and classify the change in the environment of the wireless communication channel for Wireless Local Area network (WLAN) sensing, the processor configured to detect and classify the change in the environment of the wireless communication channel based on the plurality of second channel estimation measurements and the reference channel estimation.

Example 39 includes the subject matter of any one of Examples 1-38 and optionally, comprising a radio to receive the first and second PPDUs.

Example 40 includes the subject matter of Example 39 and optionally, comprising one or more antennas connected to the radio, a memory to store data processed by the first wireless communication device, and a processor to execute instructions of an operating system.

Example 41 comprises an apparatus comprising means for executing any of the described operations of Examples 1-38.

Example 42 comprises a machine-readable medium that stores instructions for execution by a processor to perform any of the described operations of Examples 1-38.

Example 43 comprises an apparatus comprising: a memory interface; and processing circuitry configured to: perform any of the described operations of Examples 1-38.

Example 44 comprises a method to perform any of the described operations of Examples 1-38.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless communication device to:
calibrate a reference channel estimation based on a plurality of first channel estimation measurements, the plurality of first channel estimation measurements corresponding to one or more first Physical layer (PHY)

Protocol Data Units (PPDUs) received from a second wireless communication device over a wireless communication channel, wherein two consecutive channel estimation measurements of the plurality of first channel estimation measurements are separated by no more than a first time interval, wherein the reference channel estimation is configured to represent the wireless communication channel when there is no change in an environment of the wireless communication channel; and determine a plurality of second channel estimation measurements to be processed for detection of a change in the environment of the wireless communication channel based on the reference channel estimation, wherein the plurality of second channel estimation measurements corresponds to a plurality of second PPDUs received from the second wireless communication device over the wireless communication channel, wherein two consecutive channel estimation measurements of the plurality of second channel estimation measurements are separated by at least a second time interval, the second time interval is longer than the first time interval.

2. The apparatus of claim 1, wherein the two consecutive channel estimation measurements of the plurality of first channel estimation measurements comprise first and second measurements corresponding to first and second respective symbols in a same PPDU.

3. The apparatus of claim 2 configured to cause the first wireless communication device to negotiate with the second wireless communication device a count of symbols to be included per PPDU to be used for the plurality of first channel estimation measurements.

4. The apparatus of claim 2 configured to cause the first wireless communication device to transmit to the second wireless communication device a message comprising an indication of a requested count of symbols to be included per PPDU to be used for the plurality of first channel estimation measurements.

5. The apparatus of claim 2 configured to cause the first wireless communication device to process a message from the second wireless communication device, the message from the second wireless communication device comprising an indication of a supported count of symbols to be included per PPDU to be used for the plurality of first channel estimation measurements.

6. The apparatus of claim 2, wherein the first and second measurements correspond to first and second respective symbols in a same field of the same PPDU.

7. The apparatus of claim 2, wherein the first and second measurements correspond to first and second respective symbols in a Long Training Field (LTF) of the same PPDU.

8. The apparatus of claim 2, wherein the first and second measurements correspond to first and second respective symbols in a Training (TRN) field of the same PPDU.

9. The apparatus of claim 2, wherein the first and second measurements correspond to first and second respective fields in the same PPDU.

10. The apparatus of claim 1, wherein the two consecutive channel estimation measurements of the plurality of first channel estimation measurements comprise first and second measurements corresponding to first and second respective PPDUs in a burst of PPDUs, wherein two consecutive PPDUs in the burst of PPDUs are separated by no more than a Short Inter Frame Space (SIFS) time.

11. The apparatus of claim 10 configured to cause the first wireless communication device to negotiate with the second wireless communication device one or more parameters corresponding to the burst of PPDUs.

12. The apparatus of claim 11, wherein the one or more parameters corresponding to the burst of PPDUs comprise at least one of a count of PPDUs in the burst of PPDUs, a time interval between the two consecutive PPDUs in the burst of PPDUs, a time interval between consecutive bursts of PPDUs, or a count of bursts of PPDUs.

13. The apparatus of claim 1 configured to cause the first wireless communication device to negotiate with the second wireless communication device one or more parameters to configure the one or more first PPDUs to be used for the plurality of first channel estimation measurements.

14. The apparatus of claim 1 configured to cause the first wireless communication device to transmit to the second wireless communication device a message comprising an indication of one or more parameters to configure the one or more first PPDUs to be used for the plurality of first channel estimation measurements.

15. The apparatus of claim 1, wherein the first time interval is no more than 100 microseconds.

16. The apparatus of claim 1, wherein the second time interval is at least 100 times longer than the first time interval.

17. The apparatus of claim 1, wherein the second time interval is at least 50 milliseconds.

18. The apparatus of claim 1, wherein the detection of the change in the environment of the wireless communication channel comprises a detection of movement in the environment of the wireless communication channel.

19. The apparatus of claim 1 comprising a processor configured to detect and classify the change in the environment of the wireless communication channel for Wireless Local Area network (WLAN) sensing, the processor configured to detect and classify the change in the environment of the wireless communication channel based on the plurality of second channel estimation measurements and the reference channel estimation.

20. The apparatus of claim 1 comprising a radio to receive the first and second PPDUs.

21. The apparatus of claim 20 comprising one or more antennas connected to the radio, a memory to store data processed by the first wireless communication device, and a processor to execute instructions of an operating system.

22. A product comprising one or more tangible computer-readable non-transitory storage media comprising computer-executable instructions operable to, when executed by at least one processor, enable the at least one processor to cause a first wireless communication device to:

calibrate a reference channel estimation based on a plurality of first channel estimation measurements, the plurality of first channel estimation measurements corresponding to one or more first Physical layer (PHY) Protocol Data Units (PPDUs) received from a second wireless communication device over a wireless communication channel, wherein two consecutive channel estimation measurements of the plurality of first channel estimation measurements are separated by no more than a first time interval, wherein the reference channel estimation is configured to represent the wireless communication channel when there is no change in an environment of the wireless communication channel; and determine a plurality of second channel estimation measurements to be processed for detection of a change in the environment of the wireless communication channel based on the reference channel estimation, wherein the plurality of second channel estimation measurements corresponds to a plurality of second PPDUs received from the second wireless communication device over the wireless communication channel, wherein two consecutive channel estimation measurements of the plurality of second channel estimation measurements are separated by at least a second time interval, the second time interval is longer than the first time interval.

23. The product of claim 22, wherein the two consecutive channel estimation measurements of the plurality of first channel estimation measurements comprise first and second measurements corresponding to first and second respective symbols in a same PPDU.

24. The product of claim 22, wherein the two consecutive channel estimation measurements of the plurality of first channel estimation measurements comprise first and second measurements corresponding to first and second respective PPDUs in a burst of PPDUs, wherein two consecutive PPDUs in the burst of PPDUs are separated by no more than a Short Inter Frame Space (SIFS) time.

\* \* \* \* \*